United States Patent
Wang et al.

(10) Patent No.: US 10,924,162 B2
(45) Date of Patent: Feb. 16, 2021

(54) FACILITATION OF INCREMENTAL FEEDBACK FOR 5G OR OTHER NEXT GENERATION NETWORK

(71) Applicant: AT&T Intellectual Property I, L.P., Atlanta, GA (US)

(72) Inventors: Xiaoyi Wang, Austin, TX (US); Arunabha Ghosh, Austin, TX (US); Salam Akoum, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 139 days.

(21) Appl. No.: 15/588,324

(22) Filed: May 5, 2017

(65) Prior Publication Data
US 2018/0323835 A1  Nov. 8, 2018

(51) Int. Cl.
*H04B 7/0417* (2017.01)
*H04B 7/0456* (2017.01)
(Continued)

(52) U.S. Cl.
CPC ......... *H04B 7/0417* (2013.01); *H04B 7/0486* (2013.01); *H04B 7/0626* (2013.01);
(Continued)

(58) Field of Classification Search
CPC .. H04B 7/0417; H04B 7/0486; H04B 7/0626; H04B 7/0632; H04L 5/0057; H04W 72/0413; H04W 72/06; H04W 72/082
See application file for complete search history.

(56) References Cited

U.S. PATENT DOCUMENTS

| 8,295,778 B2 | 10/2012 | Kotecha et al. |
| 8,693,421 B2 | 4/2014 | Onggosanusi et al. |

(Continued)

FOREIGN PATENT DOCUMENTS

| CN | 103503324 A | 1/2014 |
| CN | 101917260 A | 1/2015 |

(Continued)

OTHER PUBLICATIONS

Sun et al. "Interference management through CoMP in 3GPP LTE-advanced networks." IEEE Wireless Communications 20.1 (2013): 59-66. http://www.datanggroup.cn/upload/fckeditor/interference%20management%20through%20comp%20in%203gpp%20tteadvanced%20networks.pdf. Retrieved on May 22, 2017, 8 pages.

(Continued)

*Primary Examiner* — Andrew Lai
*Assistant Examiner* — M Mostazir Rahman
(74) *Attorney, Agent, or Firm* — Amin, Turocy & Watson, LLP

(57) ABSTRACT

Channel state information (CSI) can be transmitted to a network node incrementally to increase network efficiency. The CSI feedback framework can be enhanced by allowing a user equipment (UE) to report multiple sets of CSI feedback, where each set can comprise a rank indicator (RI), a pre-coder matrix indicator (PMI), and a channel quality indicator (CQI). Since a different set may have a different sub-band, the CSI feedback framework can support the sub-band rank, wherein rank data from a wideband and the sub-band can be used by the network.

20 Claims, 10 Drawing Sheets

(51) Int. Cl.
*H04B 7/06* (2006.01)
*H04L 5/00* (2006.01)
*H04W 72/04* (2009.01)

(52) U.S. Cl.
CPC ......... *H04B 7/0632* (2013.01); *H04L 5/0053* (2013.01); *H04L 5/0057* (2013.01); *H04W 72/0413* (2013.01); *H04L 5/005* (2013.01)

(56) References Cited

U.S. PATENT DOCUMENTS

| | | |
|---|---|---|
| 8,787,480 B2 | 7/2014 | Gupta et al. |
| 8,811,519 B2 | 8/2014 | Yoon et al. |
| 9,008,222 B2 | 4/2015 | Stirling-gallacher et al. |
| 9,124,532 B2 | 9/2015 | Chen et al. |
| 9,197,372 B2 | 11/2015 | Zhu et al. |
| 9,247,557 B2 | 1/2016 | Liao et al. |
| 9,319,118 B2 | 4/2016 | Zhu et al. |
| 9,414,371 B2 | 8/2016 | Pi et al. |
| 9,515,715 B2 | 12/2016 | Zhang et al. |
| 9,559,820 B2 | 1/2017 | Geirhofer et al. |
| 9,621,319 B2 | 4/2017 | Kim et al. |
| 2012/0076028 A1* | 3/2012 | Ko ................. H04L 1/0026 370/252 |
| 2012/0287799 A1 | 11/2012 | Chen et al. |
| 2013/0287139 A1* | 10/2013 | Zhu ............... H04N 21/2365 375/295 |
| 2013/0301560 A1 | 11/2013 | Geirhofer et al. |
| 2014/0056156 A1* | 2/2014 | Jongren ........... H04L 1/0026 370/252 |
| 2014/0056167 A1 | 2/2014 | Yuan et al. |
| 2014/0105316 A1 | 4/2014 | Yuan et al. |
| 2014/0198751 A1 | 7/2014 | Prasad et al. |
| 2015/0049702 A1 | 2/2015 | Cheng et al. |
| 2015/0063282 A1 | 3/2015 | Kim et al. |
| 2015/0098346 A1 | 4/2015 | Guo et al. |
| 2015/0327246 A1 | 11/2015 | Kim et al. |
| 2015/0381253 A1 | 12/2015 | Kim et al. |
| 2016/0173244 A1 | 6/2016 | Ding |
| 2017/0063436 A1 | 3/2017 | Li |
| 2018/0278315 A1* | 9/2018 | Wu et al. ............ H04B 7/0626 |
| 2020/0007213 A1* | 1/2020 | Kakishima .......... H04B 7/0695 |

FOREIGN PATENT DOCUMENTS

| | | |
|---|---|---|
| CN | 101986588 | 3/2016 |
| EP | 2562952 A1 | 2/2013 |

OTHER PUBLICATIONS

Clerckx et al. "Explicit vs. Implicit Feedback for SU and MU-MIMO." Global Telecommunications Conference. (GLOBECOM 2010), 2010 IEEE. IEEE, 2010. https://pdfs.semanticscholar.org/0b26/adc9a86eebe94355af1bb9948af9b95ca342.pdf. Retrieved on May 22, 2017, 5 pages.

Lee et al. "Sectorization with beam pattern design using 3D beamforming techniques." Signal and Information Processing Association Annual Summit and Conference (APSIPA), 2013 Asia-Pacific. IEEE, 2013. http://www.apsipa.org/proceedings_2013/papers/67_PID2928677.pdf. Retrieved on May 22, 2017, 5 pages.

Barbieri et al. "Coordinated downlink multi-point communications in heterogeneous cellular networks." Information Theory and Applications Workshop (ITA), 2012. IEEE, 2012. https://pdfs.semanticscholar.org/f0e2/5353739b384bcdf366a21ad39105a945184d.pdf. Retrieved on May 22, 2017, 10 pages.

Abdulhasan et al. "An adaptive threshold feedback compression scheme based on Channel Quality Indicator (CQI) in Long Term Evolution (LTE) system." Wireless Personal Communications 82.4 (2015): 2323-2349. https://www.researchgate.net/profile/Chee_Kyun_Ng/publication/272413342_An_Adaptive_Threshold_Feedback_Compression_Scheme_Based_on_Channel_Quality_Indicator_CQI_in_Long_Term_Evolution_LTE_System/links. Retrieved on May 22, 2017, 27 pages.

* cited by examiner

FACILITATION OF INCREMENTAL FEEDBACK FOR 5G OR OTHER NEXT GENERATION NETWORK

TECHNICAL FIELD

This disclosure relates generally to facilitating of spatial domain incremental feedback. For example, this disclosure relates to facilitating spatial domain incremental multiple-input multiple-output (MIMI) channel state information (CSI) feedback for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption and lower latency than 4G equipment.

The above-described background relating to a non-orthogonal design is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
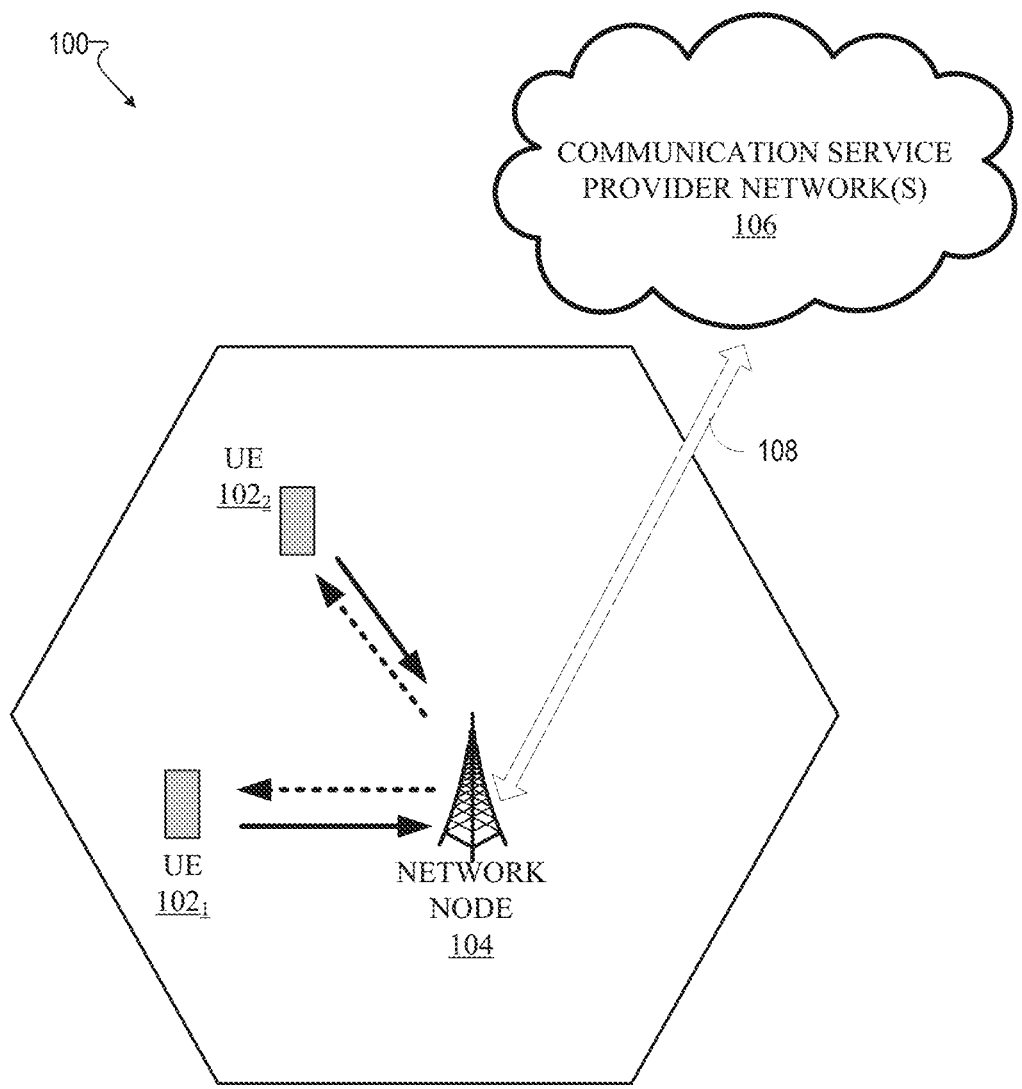
FIG. 1 illustrates an example wireless communication system in which a network node and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate incremental feedback for channel state information for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate incremental feedback for channel state information for a 5G network. Facilitating incremental feedback for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource elements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CSI-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to the each demodulation reference signal being intended for channel estimation by a single terminal. The demodulation reference signal can then be transmitted within resource blocks assigned for data traffic channel transmission to that terminal. Other than the aforementioned reference signals, there are other reference signals, namely multi-cast broadcast single frequency network (MBSFN) and positioning reference signals that can be used for various purposes.

While LTE receivers have typically been single stage receivers, more advanced receivers (e.g., turbo equalizers) can become the model for a new radio (NR). This is due to advances in computational power and also because many physical layer design aspects for NR (NR is used herein to refer to the next generation radio interface for 5G) are different from LTE. For NR there may be a need to decode multiple spatial layers in the UL. As the number of MIMO streams increase, the benefits of advanced receivers can become more significant due to an increase in inter-stream interference.

MIMO systems can significantly increase the data carrying capacity of wireless systems. For these reasons, MIMO is an integral part of the $3^{rd}$ and $4^{th}$ generation wireless systems. 5G systems will also employ MIMO systems also called massive MIMO systems (hundreds of antennas at the transmitter side and/receiver side). Typically with a $(N_t, N_r)$, where $N_t$ denotes the number of transmit antennas and Nr denotes the receive antennas, the peak data rate multiplies with a factor of $N_t$ over single antenna systems in rich scattering environment.

An uplink control channel can carry information about hybrid automatic repeat request acknowledgment (HARQ-ACK) corresponding to a downlink data transmission, and channel state information. The channel state information can comprise rank indicator (RI) data, channel quality indicator (CQI) data, and pre-coding matrix indicator (PMI) data. The PMI can be defined as an index within a codebook or the PMI as a pre-coder itself depending on the context.

The physical downlink control channel (PDCCH) can carries information about scheduling grants. Typically this can comprise a number of multiple-input multiple-output (MIMO) layers scheduled, transport block sizes, modulation for each codeword, parameters related to HARQ, sub band locations, and also PMI data corresponding to the sub bands. It should be understood that, all downlink control channel (DCI) formats may not transmit all the information. However, the contents of the PDCCH can depend on a transmission mode and the DCI format.

Within multi-codeword MIMO, the feedback channel (both downlink and uplink) overhead can be proportional to a transmission rank. For example, if the UE reported a rank is equal to 4, then the network needs to report 4 channel quality indicators. Similarly, the transmitter can transmit 4 transport block sizes, a modulation format, HARQ process numbers, redundancy versions, etc. Consequently, the feedback channel overhead is proportional to the transmission rank. To reduce the overhead, a codeword dimensioning principle can bundle the layers and supporting maximum two codewords. The codeword can be defined as an information block appended with a cyclic redundancy check (CRC).

LTE CSI feedback design was built on an assumption that the rank is a very slowly changing and wideband channel property. However, that is not necessarily true in mmWave system which normally has larger system bandwidth, and the LTE CSI feedback framework does not support a sub-band rank indicator.

This disclosure comprises an enhancement of LTE CSI feedback framework by allowing the UE to report multiple sets of CSI feedback, where each set can comprise a RI, a PMI, and a CQI. Since a different set may have a different sub-band, said framework can support the sub-band rank. Rank is defined as how many layers are transmitted at a particular sub-band. For example, the UE can report rank 1 for wideband, and report rank 2 only for some of the sub-bands. However, this also means double the overhead since the two CSI report sets have a lot in common. It should be noted that the CSI data can be permanent, predetermined, or generated in real-time based on wireless network conditions prior to the CSI data being received by the network node. For example, the rank indicator can be defined by the UE prior to it being sent to it being sent to the network node.

CSI data can assist the base station in tuning transmission parameters during MIMO transmissions. For instance, rank 1 means there is only one layer transmitting and rank 2 means there are 2 layers transmitting simultaneously. It should be noted that multiple layers (e.g., layer 3, layer 4, etc.) can also transmit simultaneously. The RI can communicate to the base station that the UE needs a channel with regards to a layer and how many layers the UE can support. The PMI determines the pre-coder of each layer, and the pre-coder determines the transmission parameter for each antenna including a phase and amplitude. The CQI can provide a quality metric. For instance, PMI data can relay that if the UE uses a specific channel, then this is the type of quality the UE will receive. Thus, if there is a high CQI, the system can select one channel versus selecting another channel in response to a low CQI. There are also dependencies between the three indicators. For example, the RI will determine the PMI and CQI formats. Thus, the PMI is dependent on RI, and the CQI is dependent on the PMI and the RI in a hierarchical type structure.

Due to the aforementioned dependencies, the rank is slow to change. For example, if the base station wants to use rank 2 for a first UE and then the base station wants to add a second UE and use rank 1, network quality will degrade because the CSI data is all following the rank 2 format, and it is difficult for the base station to override the current rank 2. However, network quality degradation can be mitigated if the UE reports the CSI data in an incremental format. The benefit of reporting the CSI data in an incremental format is that whenever the base station needs to override a rank, the base station will have the information already.

The incremental PMI is defined as the pre-coder of the second layer including the beam selection (W1) and/or co-phasing/co-efficient (W2) if a W1*W2 codebook structure is needed. During beam selection, feedback of the PMI can be broken into two parts: W1 and W2. W1 can be used to select the beam and W2 can be used to select co-phasing vectors and coefficients. Since normal PMI is an index of the codebook, then incremental PMI is an offset of the pre-coder index compared to the layer 1 PMI. Incremental CQI is a differential CQI as compared to the rank 1 CQI. The CQI can be a differential CQI, which considers the power sharing between two layers as well as cross-layer interference.

In one embodiment, described herein is a method comprising based on a first defined rank indicator associated with a first transmission layer, receiving, by a network device comprising a processor, channel state data from a wireless device of a wireless network. Based on second defined rank indicator associated with a second transmission layer, the method can comprise receiving, by the network device, incremental channel state data, different from the channel state data, from the wireless device. Additionally, based on a portion of the channel state data not comprised in the incremental channel state data and the incremental channel state data, the method can comprise allocating, by the network device, a resource for the wireless device.

According to another embodiment, a system can facilitate, receiving, from a mobile device, first channel state data representative of a first channel state of a first layer of a wireless network associated with a first frequency range. The system can also facilitate receiving, from the mobile device, second channel state data, different than the first channel state data, representative of a second channel state of a second layer, different than the first layer, of the wireless network associated with a second frequency range. Based on at least a portion of the first channel state data and the second channel state data from the mobile device, the system can facilitate assigning a resource to the mobile device.

According to yet another embodiment, described herein is a machine-readable storage medium that can perform the operations comprising facilitating sending, by a mobile device to a network device, first rank data representative of a first rank associated with a first transmission layer of a wireless network. The machine-readable storage medium can also facilitate sending, by the mobile device to the network device, second rank data representative of a second rank associated with a second transmission layer of the wireless network, wherein the second rank data is incremental information to the first rank data. In response to the facilitating the sending of the first rank data and the second rank data, the machine-readable storage medium can facilitate receiving, by the mobile device from the network device, an allocation to use a network resource of the wireless network.

These and other embodiments or implementations are described in more detail below with reference to the drawings.

FIG. 1 illustrates an example wireless communication system 100 in accordance with various aspects and embodiments of the subject disclosure. In example embodiments, system 100 is or comprises a wireless communication network serviced by one or more wireless communication network providers. In example embodiments, system 100 can comprise one or more user equipment (UEs) 102 (e.g., $102_1$, $102_2$ . . . $102n$), which can comprise one or more antenna panels comprising vertical and horizontal elements. A UE 102 can be any user equipment device, such as a mobile phone, a smartphone, a cellular enabled laptop (e.g., comprising a broadband adapter), a tablet computer, a wearable device, a virtual reality (VR) device, a heads-up display (HUD) device, a smart car, a machine-type communication (MTC) device, and the like. UE 102 can also comprise IOT devices that can communicate wirelessly. UE 102 roughly corresponds to the mobile station (MS) in global system for mobile communications (GSM) systems. Thus, the network node 104 (e.g., network node device) can provide connectivity between the UE and the wider cellular network and can facilitate wireless communication between the UE and the wireless communication network (e.g., the one or more communication service provider networks 106, described in more detail below) via a network node 104. The UE 102 can send and/or receive communication data wirelessly to the network node 104. The dashed arrow lines from the network node 104 to the UE 102 represent downlink (DL) communications and the solid arrow lines from the UE 102 to the network nodes 104 represent uplink (UL) communications.

The non-limiting term network node (e.g., network node device) can be used herein to refer to any type of network node serving a UE 102 and/or connected to other network nodes, network elements, or another network node from which the UE 102 can receive a radio signal. In typical cellular radio access networks (e.g., universal mobile telecommunications system (UMTS) networks), they can be referred to as base transceiver stations (BTS), radio base station, radio network nodes, base stations, NodeB, eNodeB (e.g., evolved NodeB), etc.). In 5G terminology, the node can be referred to as a gNodeB (e.g., gNB) device. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like.

System 100 can further comprise one or more communication service provider networks 106 that facilitate providing wireless communication services to various UEs, comprising UE 102, via the network node 104 and/or various additional network devices (not shown) included in the one or more communication service provider networks 106. The one or more communication service provider networks 106 can include various types of disparate networks, comprising: cellular networks, femto networks, picocell networks, microcell networks, internet protocol (IP) networks Wi-Fi service networks, broadband service network, enterprise networks, cloud based networks, and the like. For example, in at least one implementation, system 100 can be or can comprise a large scale wireless communication network that spans various geographic areas. According to this implementation, the one or more communication service provider networks 106 can be or can comprise the wireless communication network and/or various additional devices and components of the wireless communication network (e.g., additional network devices and cells, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

In one technique, the UE 102 can send a reference signal back to the network node 104. The network node 104 takes a received reference signal from the UE 102, estimates the condition of the channel, which can be influenced by various factors, such as objects in the line of sight, weather, movement, interference, etc., and after correcting for more issues (e.g., interference), adjusts the beamforming rates for each antenna transmitting to the UE 102, and changes parameters, so as to transmit a better beam toward the UE 102. This ability to select MIMO schemes and use beamforming to focus energy and adapt to changing channel conditions can allow for higher data rates.

Figure 2:
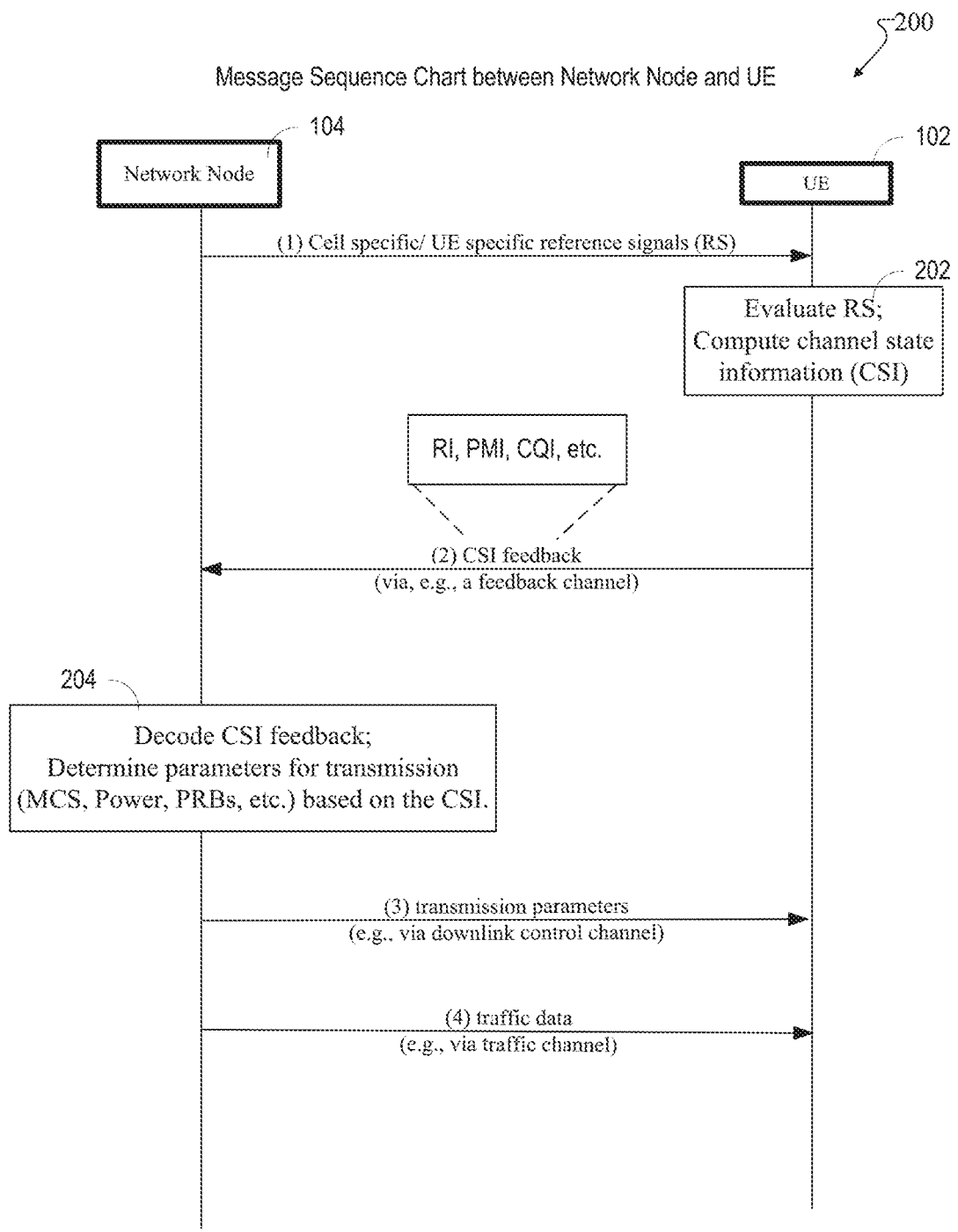
FIG. 2 illustrates a message sequence chart between a network node and UE in an LTE network.

FIG. 2 depicts a message sequence chart 200 for downlink data transfer in 5G systems. A user equipment (e.g., UE 102) can determine transmission parameters from evaluating a reference signal from a network node (e.g., network node 104), estimate the channel characteristics, and send CSI feedback back to the network node. The network node 104 can transmit reference signals to the UE 102. The network node 102 can transmit a reference signal (RS) at transaction (1), which can be beam formed or non-beam formed, to UE 102. The reference signals can be cell specific and/or user equipment 102 specific in relation to a profile of the user equipment 102 or some type of mobile identifier. After receiving this reference signal, at block 202, the UE 102 can evaluate the reference signal and compute the CSI, which can be transmitted to the network node as CSI feedback (e.g., a CSI report). The CSI feedback can comprise: an indicator of channel quality (e.g., channel quality indicator (CQI) in LTE terminology), a pre-coding matrix indicator (PMI in LTE terminology), an indicator of the rank (e.g., Rank Indicator (RI) in LTE terminology), sub-band indices, beam indices, a CSI-resource indicator (e.g., CRI the same as beam indicator), etc. The PMI can be used for selection of transmission parameters for the different data streams transmitted between the network node and the UE (e.g., the indicator of CSI can be similar to what is referred to in LTE as the pre-coding matrix indicator PMI and can be used in a similar manner).

In techniques using codebook-based pre-coding, the network node and UE uses different codebooks, which can be found in standards specifications, each of which relate to different types of MIMO matrices (for example, a codebook of pre-coding matrices for 2×2 MIMO). The codebook is known (contained) at the base station and the UE site, and can contain entries of pre-coding vectors and matrices, which are multiplied with the signal in the pre-coding stage of the network node. The decision as to which of these codebook entries to select is made at the network node based on CSI feedback provided by the UE, because the CSI is known at the receiver, but not at the transmitter. Based on the evaluation of the reference signal, the UE transmits feedback at transaction (2) (e.g., via a feedback channel, which can be separate from the channel the reference signal was sent on), which comprises recommendations for a suitable pre-coding matrix out of the appropriate codebook. This UE feedback identifying the pre-coding matrix is called the pre-coding matrix indicator (PMI), wherein the UE is pointing to one of these codebook entries. The UE is thus evaluating which pre-coding matrix would be more suitable for the transmissions between the network node and UE.

Also included in the CSI feedback is the rank indicator (RI) which provides an indication of the rank of the channel matrix, wherein the rank is the number of different transmission data streams (layers) transmitted in parallel (in other words, the number of spatial layers) between the network node and the UE. The RI determines the format of the rest of the CSI reporting messages. As an example, in the case of LTE, when RI is reported to be 1, the rank 1 codebook PMI will be transmitted with one CQI, and when RI is 2, a rank 2 codebook PMI and two CQIs will be transmitted.

The user equipment 102 can transmit the CSI report to the network node 104 via the feedback channel either on request from the network node 104, a-periodically, and/or periodically. Processing of the CSI feedback by the network node 104, as shown in block 204 of FIG. 2, can comprise decoding the CSI feedback. The UE can decode the RI and then use the decoded information (for example, the obtained size of the CSI) to decode the remainder of the CSI (e.g., the CQI, PMI, etc.). A network scheduler can leverage the CSI report to determine downlink transmission scheduling parameters at block 204, which are particular to the user equipment 102. The scheduling parameters can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the parameters at transaction (3) to the UE 102 via a downlink control channel. Thereafter and/or simultaneously, at transaction (4), traffic data can be transferred, via a data traffic (e.g., non-control data such as data related to texts, emails, pictures, audio files videos, etc.) channel, from the network node 104 to the UE 102.

Figure 3:
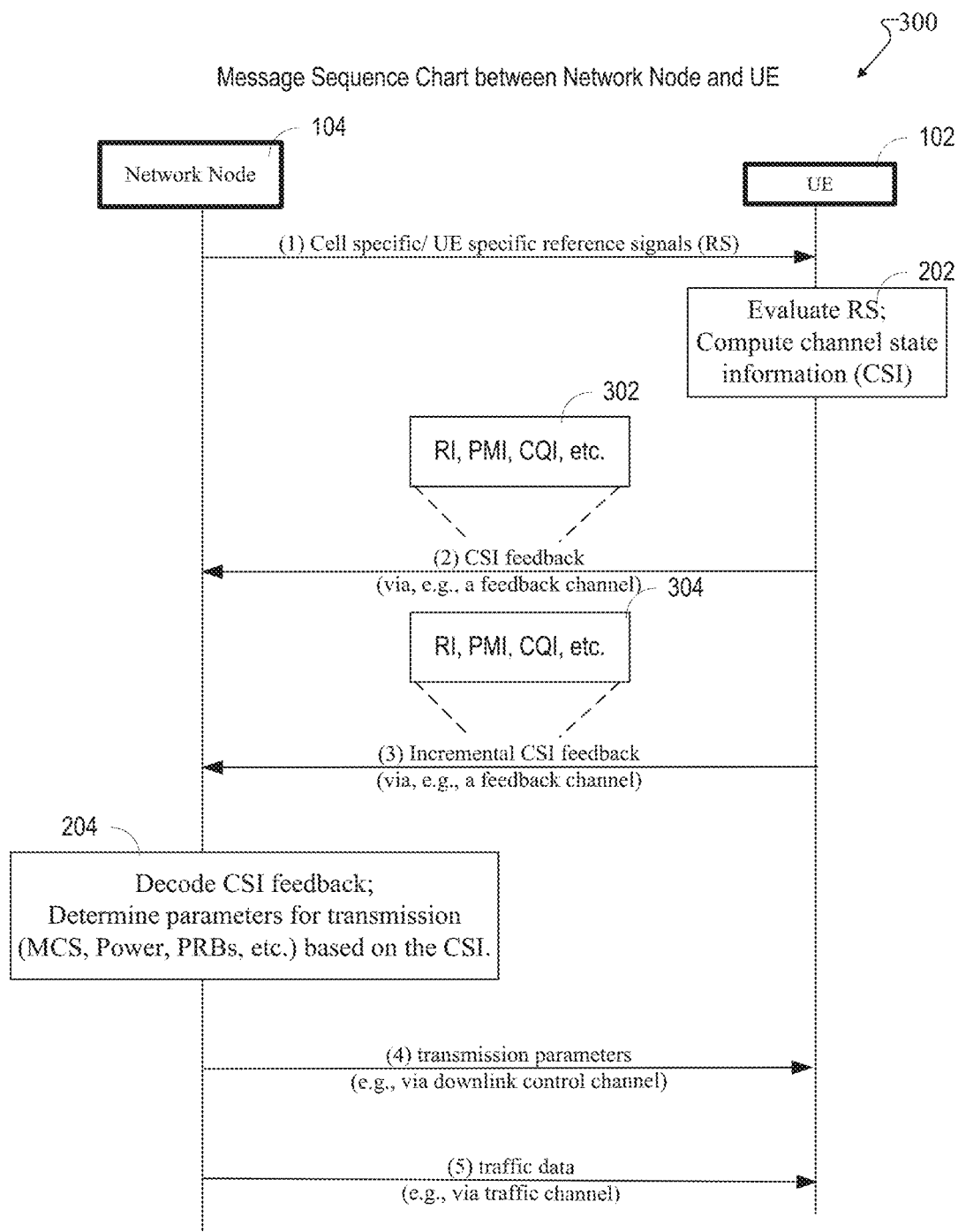
FIG. 3 illustrates a message sequence chart between a network node and UE sending incremental channel state information in an LTE network.

Referring now to FIG. 3, illustrated is a message sequence chart 300 between a network node and UE sending incremental channel state information in an LTE network. A user equipment (e.g., UE 102) can determine transmission parameters from evaluating a reference signal from a network node (e.g., network node 104), estimate the channel characteristics, and send CSI feedback back to the network node. The network node 104 can transmit reference signals to the UE 102. The network node 102 can transmit a reference signal (RS) at transaction (1), which can be beam formed or non-beam formed, to UE 102. The reference signals can be cell specific and/or user equipment 102 specific in relation to a profile of the user equipment 102 or some type of mobile identifier. After receiving this reference signal, at block 202, the UE 102 can evaluate the reference signal and compute the CSI, which can be transmitted to the network node as CSI feedback (e.g., a CSI report). The CSI feedback can comprise: an indicator of channel quality (e.g., channel quality indicator (CQI) in LTE terminology), a pre-coding matrix indicator (PMI in LTE terminology), an indicator of the rank (e.g., Rank Indicator (RI) in LTE terminology), sub-band indices, beam indices, a CSI-resource indicator (e.g., CRI the same as beam indicator), etc. The PMI can be used for selection of transmission parameters for the different data streams transmitted between the network node and the UE (e.g., the indicator of CSI can be similar to what is referred to in LTE as the pre-coding matrix indicator PMI and can be used in a similar manner).

Based on the evaluation of the reference signal, the UE transmits CSI feedback 302 at transaction (2) (e.g., via a feedback channel, which can be separate from the channel the reference signal was sent on), which comprises recommendations for a suitable pre-coding matrix out of the appropriate codebook. This UE feedback identifying the pre-coding matrix is called the pre-coding matrix indicator (PMI), wherein the UE is pointing to one of these codebook entries. The UE is thus evaluating which pre-coding matrix would be more suitable for the transmissions between the network node and UE.

Also included in the CSI feedback 302 is the rank indicator (RI) which provides an indication of the rank of the channel matrix, wherein the rank is the number of different transmission data streams (layers) transmitted in parallel (in other words, the number of spatial layers) between the network node and the UE. The RI determines the format of the rest of the CSI reporting messages. As an example, in the case of LTE, when RI is reported to be 1, the rank 1 codebook PMI will be transmitted with one CQI, and when RI is 2, a rank 2 codebook PMI and two CQIs will be transmitted.

The user equipment 102 can transmit the CSI report to the network node 104 via the feedback channel either on request from the network node 104, a-periodically, and/or periodically. Processing of the CSI feedback by the network node 104, as shown in block 204 of FIG. 2, can comprise decoding the CSI feedback. The network node 104 can decode the RI and then use the decoded information (for example, the obtained size of the CSI) to decode the remainder of the CSI (e.g., the CQI, PMI, etc.).

The transmitted CSI report can be associated with a rank 1, indicative of a first transmission layer for widebeam communication. Alternatively, the user equipment 102 can transmit a second CSI report to the network node 104 via the feedback channel either on request from the network node 104, a-periodically, and/or periodically. The second CSI report can comprise incremental CSI data, wherein the incremental CSI data is indicative of a transmission layer, wherein the transmission layer number (e.g., rank number) is incremented (e.g., transmission layer 1, transmission layer 2, transmission layer 3, etc.) and wherein the second transmission layer is for communication via a sub-band frequency. Since the sub-band for transmission layer 2 comprises data that is also included in the wideband for transmission layer 1, some of the data in the in the transmission layer 2 is redundant to that of transmission layer 1, although the sub-band operates on less frequencies than the wideband. It should be understood that other implementations are also possible, such as a third transmission layer over the second transmission layer, a fourth transmission layer over the third transmission layer, and so on.

Consequently, the incremental CSI feedback 304 can be sent from the UE 102 to the network node 104 over the feedback channel via transaction (3). The feedback channel can be the same feedback channel that was used to send the CSI feedback 302 to the network node 104 or a different feedback channel for sending incremental CSI feedback altogether.

This UE feedback identifying the pre-coding matrix for layer 2 can also be called the pre-coding matrix indicator (PMI), wherein the UE is pointing to one of these codebook entries for layer 2 transmission. The UE is thus evaluating which pre-coding matrix for layer 2 transmission would be more suitable for the transmissions between the network node and UE.

Also included in the incremental CSI feedback 304 is the rank indicator (RI) which provides an indication of the rank (e.g., rank 2) of the channel matrix, wherein the rank is the number of different transmission data streams (layers) transmitted in parallel (in other words, the number of spatial layers) between the network node and the UE. Therefore, in this case, the rank is 2 because the $2^{nd}$ transmission layer can transmit in parallel with the $1^{st}$ transmission layer. Therefore, a rank 2 codebook PMI and two CQIs will be transmitted.

A network scheduler can leverage the CSI report to determine downlink transmission scheduling parameters at block 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling.

The network node 104 can transmit the parameters at transaction (4) to the UE 102 via a downlink control channel. Thereafter and/or simultaneously, at transaction (5), traffic data can be transferred, via a data traffic (e.g., non-control data such as data related to texts, emails, pictures, audio files videos, etc.) channel, from the network node 104 to the UE 102. It should be understood that the transaction (3) can occur at any time after the transaction (2). More specifically, the transaction (3) for incremental CSI feedback can occur after the CSI feedback 302 has been decoded at block 204, thus prompting an additional decoding to generate additional data to be transmitted and/or transferred to the UE 102 via the downlink control channel and/or the data traffic channel, respectively.

Figure 4:
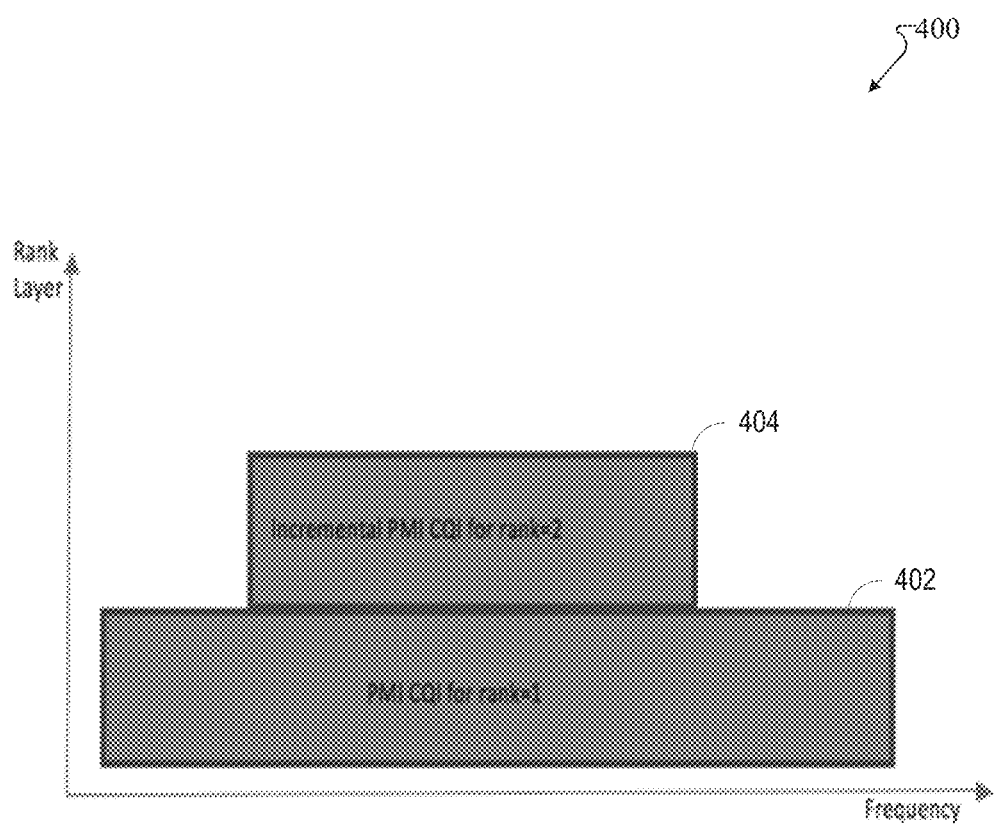
FIG. 4 illustrates an example schematic system graph for rank layer versus frequency according to one or more embodiments.

Referring now to FIG. 4, illustrated is an example schematic system graph 400 for rank layer versus frequency according to one or more embodiments. The schematic system graph 400 represents CSI feedback 302 in accordance with a first transmission layer 402 as a function of rank layer and frequency. The first transmission layer 402 can be a wideband or a UE 102 selected sub-band. Therefore, the UE 102 can report the PMI and CQI assuming the rank equals 1 for the first transmission layer 402. Additionally, the system graph 400 represents incremental CSI feedback 304 in accordance with a second transmission layer 404 as a function of rank layer and frequency. The second transmission layer 404 can be a sub-band of the wideband. Therefore, the UE 102 can report the incremental PMI and incremental CQI assuming the rank equals 2 for the second transmission layer 404 on a UE 102 selected sub-band on top of the first transmission layer 402. This framework allows the UE 102 to report higher rank CSI in an incremental format for a subset of bandwidth as reported for a lower rank CSI. With such information, a gNodeB scheduler can make decisions based on the rank and resource allocation for each UE 102. For example, is the gNodeB can select the rank and resource bandwidth allocation jointly (e.g., the UE 102 can support rank=2 on some of the sub-bands while rank=1 on a wideband bandwidth). The scheduler can also decide to schedule the UE $102_1$ in the rank=2 sub-band and then schedule another UE $102_2$ on other sub-bands.

Figure 5:
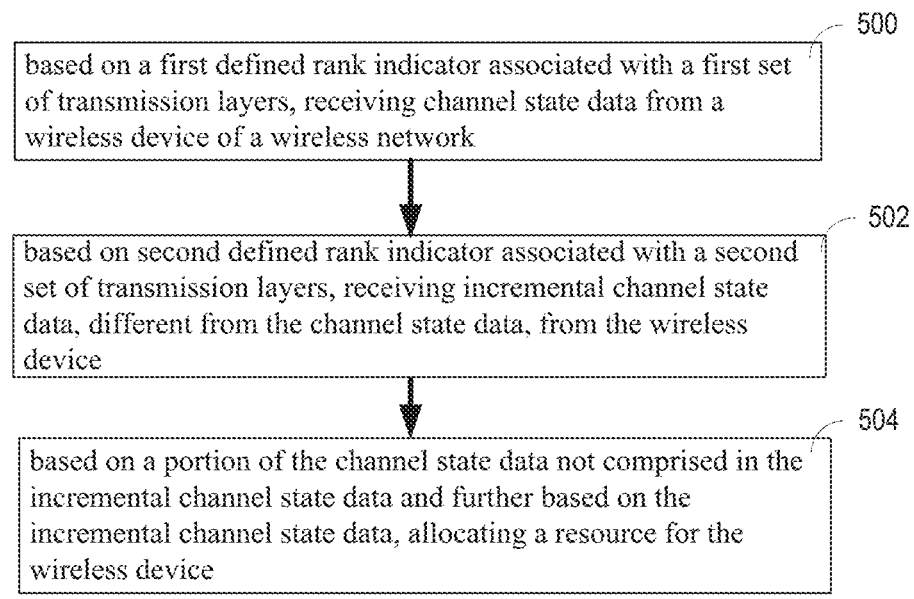
FIG. 5 illustrates an example schematic system block diagram of a method for incremental channel state data reporting.

Referring now to FIG. 5 illustrates an example schematic system block diagram of a method for incremental channel state data reporting. At element 500, based on a first defined rank indicator associated with a first transmission layer (e.g., first transmission layer 402), the method can comprise receiving, by a network device (e.g., network node 104) comprising a processor, channel state data from a wireless device (e.g., UE 102) of a wireless network. At element 502, based on second defined rank indicator associated with a second transmission layer (e.g., second transmission layer 404), the method can comprise receiving, by the network device (e.g., network node 104), incremental channel state data (e.g., incremental CSI feedback 304), different from the channel state data (e.g., CSI feedback 302), from the wireless device (e.g., UE 102). Additionally, based on a portion of the channel state data (e.g., CSI feedback 302) not comprised in the incremental channel state data (e.g., incremental CSI feedback 304) and further based on the incremental channel state data, the method can comprise allocating, by the network device (e.g., network node 104), a resource for the wireless device (e.g., UE 102) at element 504.

Figure 6:
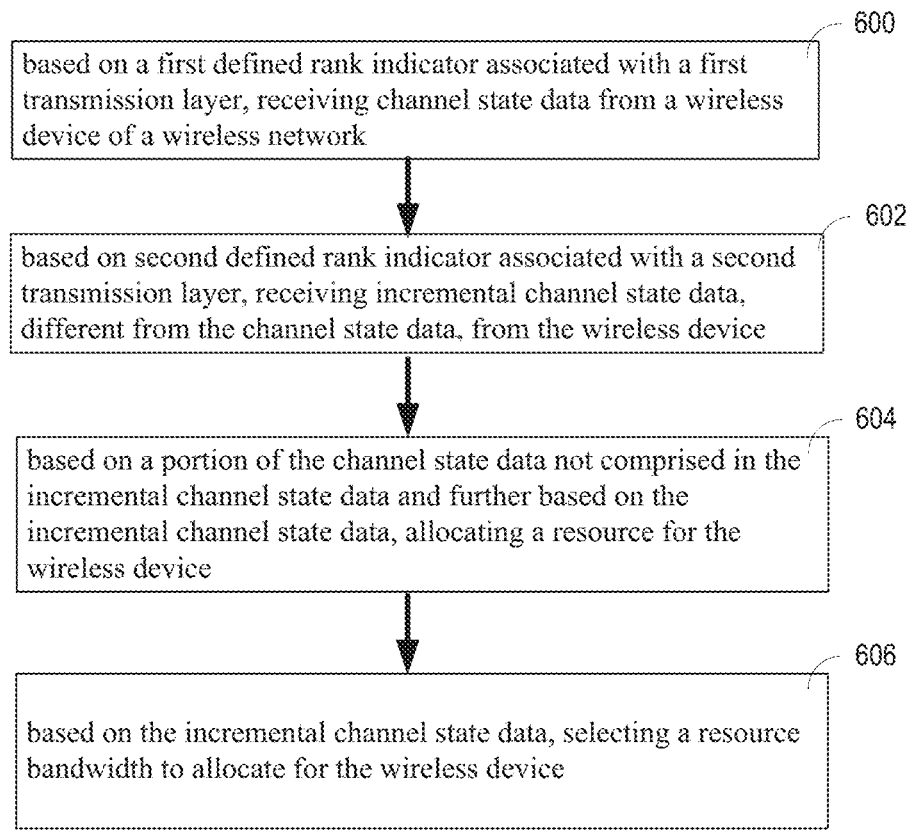
FIG. 6 illustrates an example schematic system block diagram of a method for incremental channel state data reporting and selecting a resource bandwidth.

Referring now to FIG. 6, illustrated is an example schematic system block diagram of a method for incremental channel state data reporting and selecting a resource bandwidth. At element 600, based on a first defined rank indicator associated with a first transmission layer (e.g., first transmission layer 402), the method can comprise receiving, by a network device (e.g., network node 104) comprising a processor, channel state data from a wireless device (e.g., UE 102) of a wireless network. At element 602, based on second defined rank indicator associated with a second transmission layer (e.g., second transmission layer 404), the method can comprise receiving, by the network device (e.g., network node 104), incremental channel state data (e.g., incremental CSI feedback 304), different from the channel state data (e.g., CSI feedback 302), from the wireless device (e.g., UE 102). Additionally, based on a portion of the channel state data (e.g., CSI feedback 302) not comprised in the incremental channel state data (e.g., incremental CSI feedback 304) and further based on the incremental channel state data, the method can comprise allocating, by the network device (e.g., network node 104), a resource for the wireless device (e.g., UE 102) at element 604. Based on the incremental channel state data (e.g., incremental CSI feedback 304), the method can also comprise selecting, by the network device (e.g., network node 104), a resource bandwidth to allocate for the wireless device (e.g., UE 102) at element 606.

Figure 7:
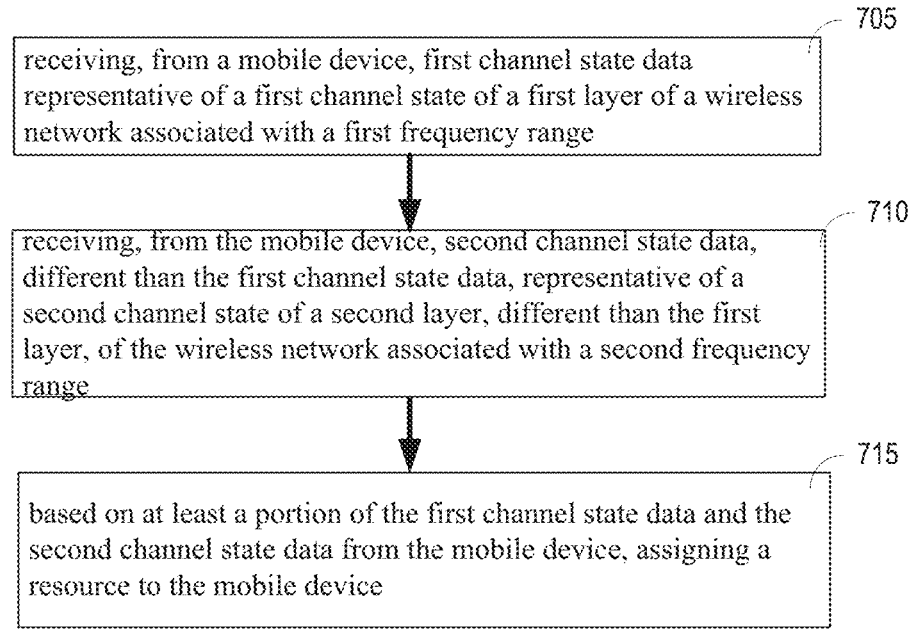
FIG. 7 illustrates an example schematic system block diagram of system for assigning a resource to a mobile device based on incremental channel state data.

Referring now to FIG. 7, illustrated is an example schematic system block diagram of system for assigning a resource to a mobile device (e.g., UE 102) based on incremental channel state data. The system can comprise receiving, from a mobile device (e.g., UE 102), first channel state data (e.g., CSI feedback 302) representative of a first channel state of a first layer of a wireless network associated with a first frequency range at element 700. At element 702, the system can also comprise receiving, from the mobile device (e.g., UE 102), second channel state data (e.g., incremental CSI feedback 304), different than the first channel state data (e.g., CSI feedback 302), representative of a second channel state of a second layer, different than the first layer, of the wireless network associated with a second frequency range. Based on at least a portion of the first channel state data (e.g., CSI feedback 302) and the second channel state data (e.g., incremental CSI feedback 304) from the mobile device (e.g., UE 102), assigning a resource to the mobile device at element 706.

Figure 8:
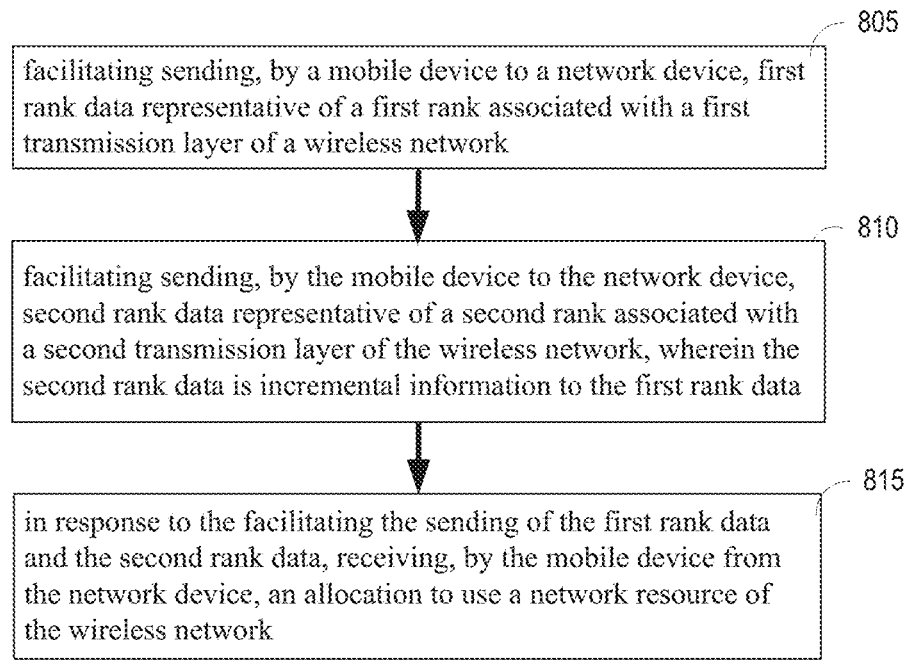
FIG. 8 illustrates an example schematic system block diagram of a machine-readable medium for allocating a network resource.

Referring now to FIG. 8, illustrated is an example schematic system block diagram of a machine-readable medium for allocating a network resource. At element 800, the machine-readable medium can facilitate sending, by a mobile device (e.g., UE 102) to a network device (e.g., network node 104), first rank data (e.g., CSI feedback 302) representative of a first rank associated with a first transmission layer of a wireless network. At element 802, the machine-readable medium can facilitate sending, by the mobile device (e.g., UE 102) to the network device (e.g., network node 104), second rank data (e.g., incremental CSI feedback 304) representative of a second rank associated with a second transmission layer of the wireless network, wherein the second rank data (e.g., incremental CSI feedback 304) is incremental information to the first rank data (e.g., CSI feedback 302). Furthermore, at element 804, in response to the facilitating the sending of the first rank data (e.g., CSI feedback 302) and the second rank data (e.g., incremental CSI feedback 304), the machine-readable medium can receive, by the mobile device (e.g., UE 102) from the network device (e.g., network node 104), an allocation to use a network resource of the wireless network.

Figure 9:
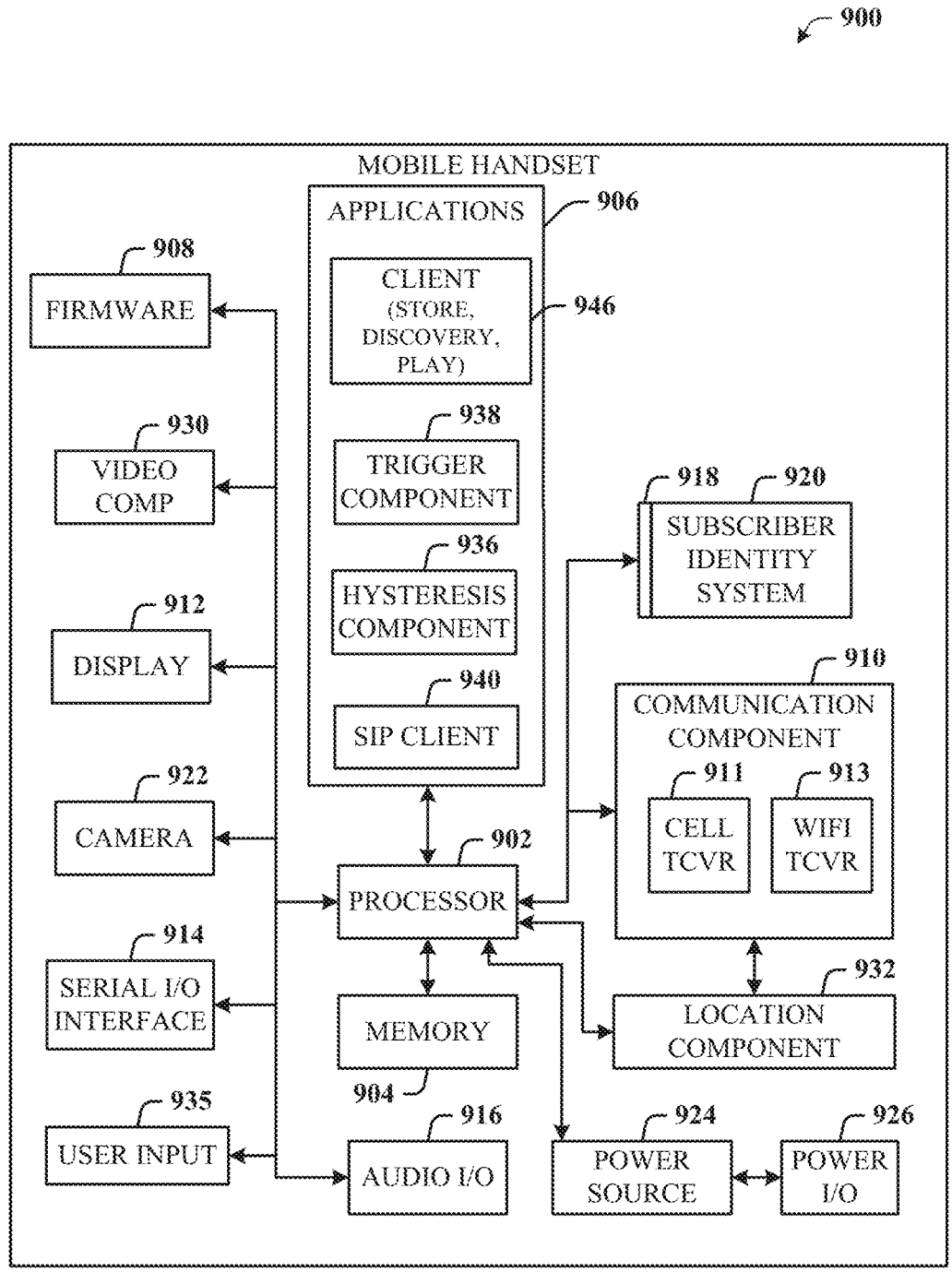
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an example end-user device such as a user equipment (e.g., UE 102) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description comprises a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 900 comprises a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 comprises a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also comprises a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, comprises an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
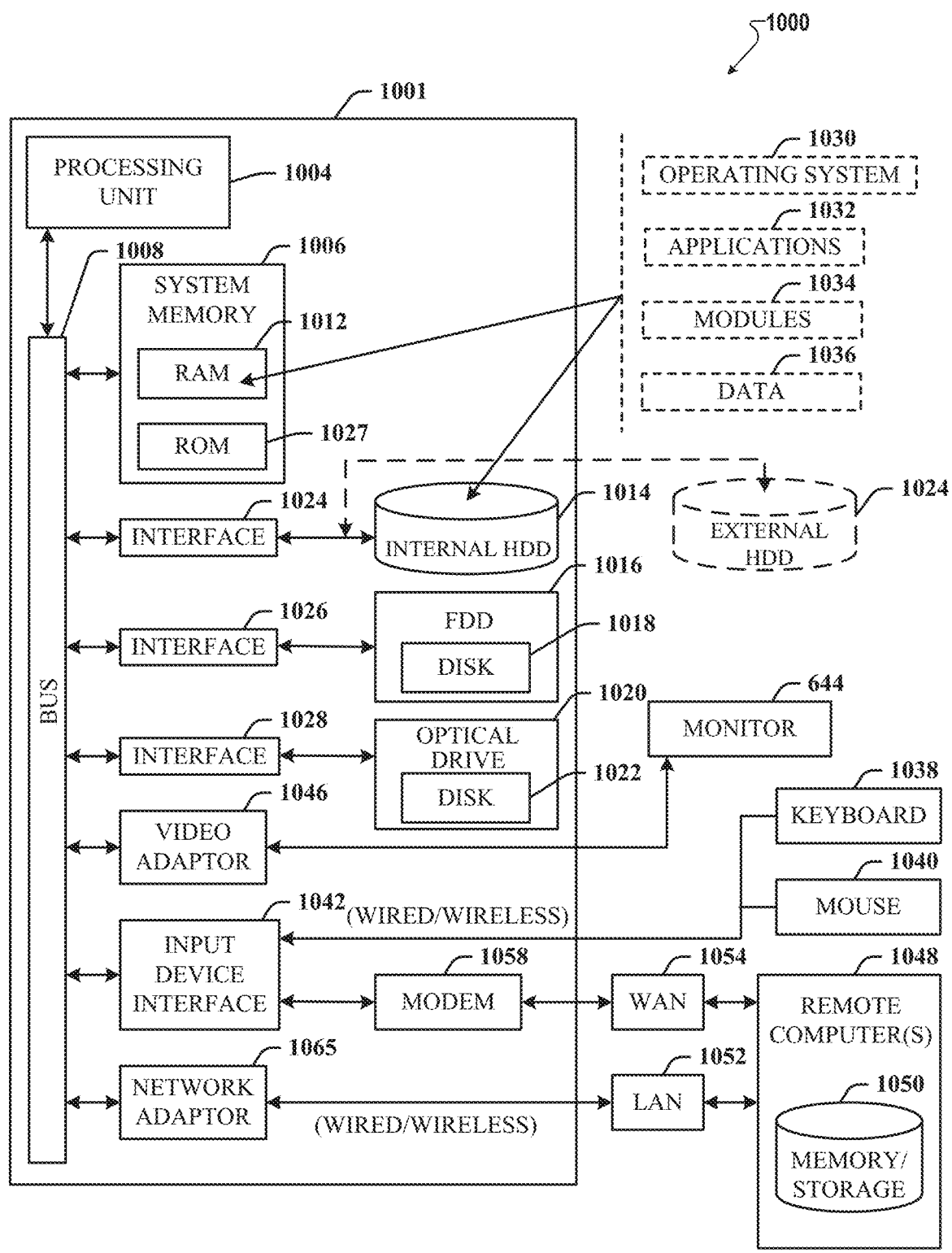
FIG. 10 illustrates an example block diagram of an example computer operable to engage in a system architecture that facilitates secure wireless communication according to one or more embodiments described herein.

Referring now to FIG. 10, there is illustrated a block diagram of a computer 1000 operable to execute the functions and operations performed in the described example embodiments. For example, a network node (e.g., network node 104) can contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 comprising a processing unit 1004, a system memory 1006 and a system bus 1008. The system bus 1008 couples system components comprising the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 comprises read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further comprises an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1012, comprising an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 2394 serial port, a game port, a USB port, an IR interface, etc.

A monitor 1044 or other type of display device is also connected to the system bus 1008 through an interface, such as a video adapter 1046. In addition to the monitor 1044, a computer 1000 typically comprises other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically comprises many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions or machine-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell,"

"cell site," and the like, can be utilized interchangeably in the subject application, and refer to a wireless network component or appliance that serves and receives data, control, voice, video, sound, gaming, or substantially any datastream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
based on a first defined rank indicator associated with a first physical transmission network layer, receiving, by a network device comprising a processor, channel state data from a wireless device of a wireless network, wherein the channel state data comprises pre-coding matrix data representative of a pre-coding matrix index associated with a pre-coding matrix for selection of an amplitude and phase transmission parameter associated with a transmission between the wireless device and the network device;
based on second defined rank indicator associated with a second physical transmission network layer, receiving, by the network device, incremental channel state data, different from the channel state data, from the wireless device, wherein a precoder matrix index is based on the second defined rank indicator, wherein the incremental channel state data comprises an incremental precoder matrix index representative of an offset of a precoder index associated with the first physical transmission network layer, wherein the incremental channel state data comprises a differential channel quality indicator associated with a power sharing between the first physical transmission layer and the second physical transmission network layer, and wherein a ranking associated with the channel state data, having been increased by an increment, resulted in the incremental channel state data;
based on a portion of the channel state data not comprised in the incremental channel state data, the amplitude and phase transmission parameter, and further based on the incremental channel state data, allocating, by the network device, a resource for the wireless device;
based on at least the portion of the channel state data and the incremental channel state data, selecting, by the network device, a third physical transmission network layer of the wireless network;
utilizing, by the network device, the incremental channel state data to select a co-phasing vector usable to select a beam to allocate the resource for the wireless device; and
based on the incremental channel state data, selecting, by the network device, a resource bandwidth to allocate for the wireless device, wherein selecting the resource bandwidth and selecting the third physical transmission network layer are performed concurrently.

2. The method of claim 1, further comprising:
receiving, by the network device, the channel state data via a wideband of the wireless network.

3. The method of claim 1, further comprising:
receiving, by the network device, the incremental channel state data via a sub-band of the wireless network.

4. The method of claim 3, wherein the sub-band comprises a lower frequency than a wideband channel of the wireless network.

5. The method of claim 1, wherein the differential channel quality indicator comprises cross-layer interference data associated with a cross-layer interference between the first transmission network layer and the second transmission network layer.

6. The method of claim 5, wherein the incremental channel state data is associated with a sub-band selected by the network device applicable to channel of the wireless network.

7. The method of claim 1, wherein the incremental channel state data comprises incremental pre-coding matrix data different than the pre-coding matrix data and the incremental channel state data.

8. A system, comprising:
a processor; and
a memory that stores executable instructions that, when executed by the processor, facilitate performance of operations, the system comprising:
receiving, from a mobile device, first channel state data representative of a first channel state of a first layer of a wireless network associated with a first frequency range, wherein the first channel state data comprises pre-coding matrix data representative of a pre-coding matrix for selection of an amplitude and phase transmission parameter associated with an antenna of the mobile device;
receiving, from the mobile device, second channel state data, different than the first channel state data, representative of a second channel state of a second layer, different than the first layer, of the wireless network associated with a second frequency range, wherein the second channel state data comprises an incremental precoder matrix index representative of an offset of a precoder index associated with the first layer, wherein the precoder index is based on a defined rank indicator, and wherein the second channel state data comprises a differential channel quality indicator associated with a sharing of power between a first physical transmission layer and a second physical transmission layer, and wherein a ranking associated with the second channel state data, having been increased by an increment, results in incremental channel state data;
based on at least a portion of the first channel state data and the incremental channel state data from the mobile device, assigning a resource to the mobile device wherein the resource is a bandwidth applicable to the mobile device, and wherein assigning the resource and selecting the third physical transmission layer are performed concurrently;
based on at least the portion of the first channel state data and the incremental channel state data, selecting a third physical transmission layer of the wireless network; and
utilizing the incremental precoder matrix index to select a co-phasing vector applicable to assign the resource to the mobile device.

9. The system of claim 8, wherein the first frequency range is a wideband of the wireless network.

10. The system of claim 9, wherein the second frequency range is a sub-band of the wireless network applicable to fewer frequencies than the wideband.

11. The system of claim 8, wherein the pre-coding matrix data is first pre-coding matrix data different than second pre-coding matrix data associated with the second channel state data.

12. The system of claim 8, wherein the first channel state data comprises a first channel quality indicator of a first channel between the system and the mobile device and the second channel state data comprises a second channel quality indicator different than the first channel quality indicator of a second channel between the system and the mobile device.

13. The system of claim 12, wherein the second channel state data is associated with a sub-band selected by the mobile device applicable to the second channel.

14. The system of claim 8, wherein the operations further comprise:
receiving the first channel state data via a wideband of the wireless network; and
receiving the second channel state data via a sub-band of the wireless network, wherein the sub-band comprises a lower frequency than the wideband.

15. A non-transitory machine-readable medium, comprising executable instructions that, when executed by a processor, facilitate performance of operations, comprising:
facilitating sending, by a mobile device to a network device, first rank data representative of a first rank associated with a first transmission layer of a wireless network;
facilitating sending, by the mobile device to the network device, channel state data comprising pre-coding matrix data associated with a pre-coding matrix to be utilized for selection of an amplitude and phase transmission parameter of an antenna of the mobile device to facilitate a transmission between the mobile device and the network device;
facilitating sending, by the mobile device to the network device, second rank data representative of a second rank associated with a second transmission layer of the wireless network, wherein the second rank data is incremental information to the first rank data, wherein the incremental information comprises an incremental precoder matrix index representative of an offset of a precoder index associated with the first transmission layer, wherein the precoder index is based on the second rank, and wherein the incremental information comprises a differential channel quality indicator associated with a power sharing of power between the first transmission layer and the second transmission layer;
based on at least a portion of the channel state data and the incremental information, selecting a third transmission layer of the wireless network;
in response to facilitating sending of the first rank data and the second rank data, receiving, by the mobile device from the network device, an allocation to use a network resource of the wireless network; and
based on the incremental information and a selected co-phasing vector, receiving, by the mobile device, an allocation of the network resource from the wireless network; and
based on the incremental information, selecting, a resource bandwidth to allocate for the mobile device, wherein selecting the resource bandwidth and selecting the third transmission layer are performed concurrently.

16. The non-transitory machine-readable medium of claim 15, wherein the first rank data comprises first pre-coding matrix data associated with a first pre-coding matrix index for selection of a transmission parameter associated with the first transmission layer, and wherein the second rank data comprises second pre-coding matrix data, different than the first pre-coding matrix data, associated with a second pre-coding matrix index.

17. The non-transitory machine-readable medium of claim 16, wherein the first rank data comprises first channel quality data associated with a first channel quality indicator of a first channel between the mobile device and the network device, and wherein the second rank data comprises second channel quality data of a second channel between the mobile device and the network device, different than the first channel quality data, associated with a second channel quality indicator.

18. The non-transitory machine-readable medium of claim 17, wherein the first rank data is representative of the first rank of a first frequency band applicable to the first channel between the mobile device and the network device, wherein the second rank data is representative of the second rank of a second frequency band applicable to the second channel between the mobile device and the network device, and wherein the first frequency band is a wider band than the second frequency band.

19. The non-transitory machine-readable medium of claim 18, wherein the differential channel quality indicator is associated with differential channel quality indicator data, and wherein the differential channel quality indicator data comprises cross-layer interference data associated with a cross-layer interference between the first transmission layer and the second transmission layer.

20. The non-transitory machine-readable medium of claim 18, wherein the second channel quality indicator comprises cross-layer interference data representative of a cross-layer interference between the first transmission layer and the second transmission layer.

* * * * *